INVENTORS
Bernard E. Bowers and
Earl E. Snyder
BY Frease, Bishop, Johns & Schick
ATTORNEYS

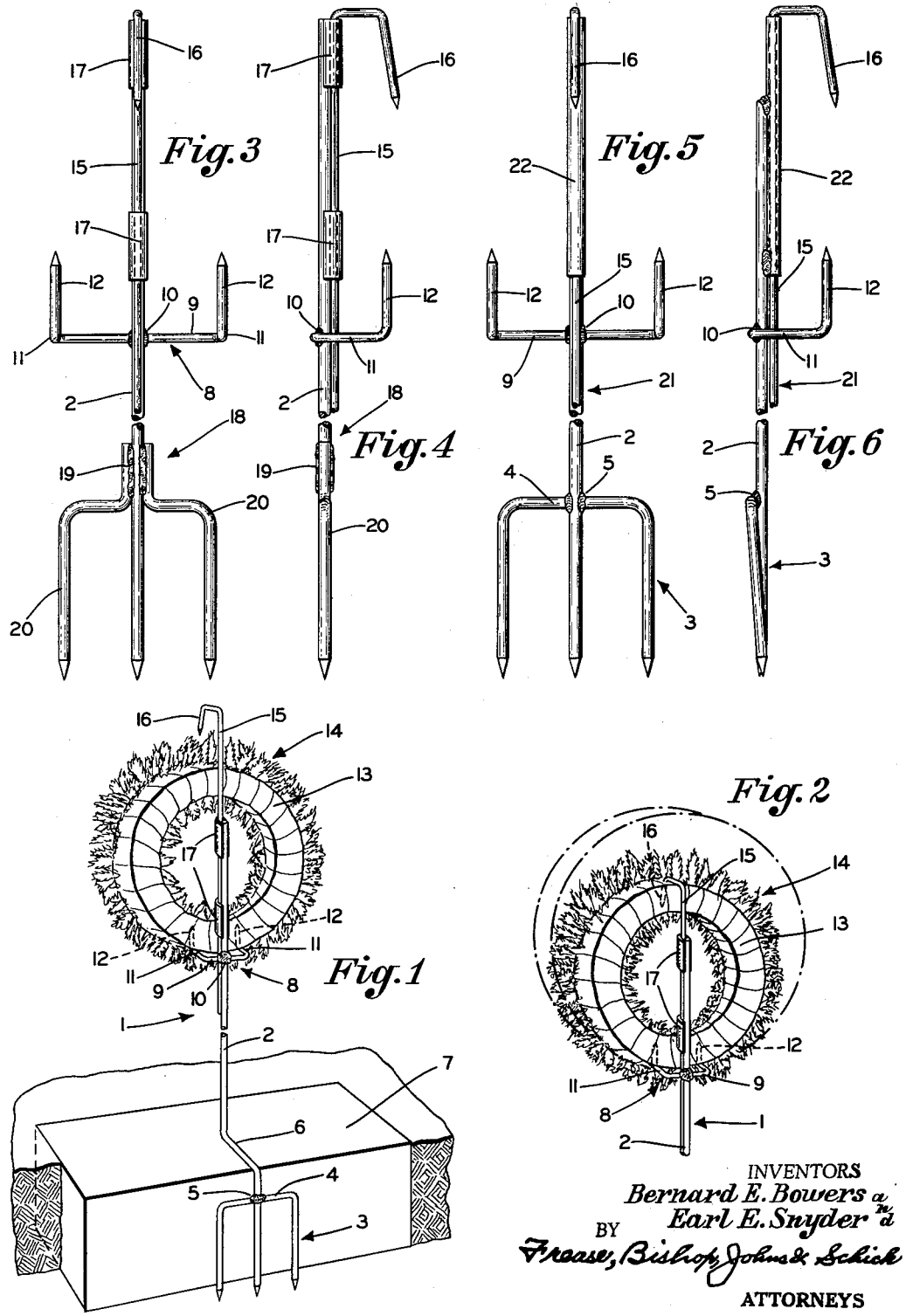

United States Patent Office 3,136,510
Patented June 9, 1964

3,136,510
CEMETERY WREATH HOLDER
Bernard E. Bowers, 1615 42nd St. NW., and Earl E. Snyder, 5833 Nella Ave. NW., both of Canton, Ohio
Filed Oct. 23, 1962, Ser. No. 232,445
1 Claim. (Cl. 248—27.8)

The invention relates to cemetery wreath holders and more particularly to an improved wreath holder construction, preferably foldable, which may be used to securely support and hold wreaths or sprays or other floral pieces or arrangements of various sizes and shapes, without wiring, at a desired cemetery location, and without likelihood of falling or blowing over, and preferably in such position with reference to a grave marker that surrounding grass may be mowed without interference by the wreath holder.

Prior wreath holders of one type have been of tripod design with sliding braces between the three legs to permit the tripod arrangement to be folded flat for storage and shipment. These holders have a single hook at the top for suspending the wreath. In use, special tools and florist wire have been required to securely mount a wreath, suspended by the single top hook, on the tripod. The wire-mounting of the wreath on the tripod requires labor and time, usually five to ten minutes. The tripod when placed in a cemetery usually merely stands at the desired location, can be blown or knocked over readily, and interferes with grass mowing. If the tripod legs are pointed at the bottom sometimes the legs are inserted into the ground in an attempt to obtain stability. However, the tapered leg arrangement of a tripod does not accomplish secure anchoring, since the holder has a tendency to work out of the ground when bumped or blown by moderate winds.

Another prior wreath holder includes an upright rod support, forked at the bottom for driving into the ground and pointed at the top to suspend the wreath. Intervening cross members are provided to which the wreath is wired to prevent the wreath from swinging in the wind on the top suspension. A spring extending upward from the lower end of the rod is sometimes provided intended to clamp the wreath to the rod.

Prior wreath holders have the common characteristics of requiring a range of holder sizes to accommodate wreaths of various sizes, and of requiring a wiring operation to assure that the wreath is secure on the holder.

Accordingly, it is a general object of the invention to provide a new wreath holder construction which eliminates the problems and difficulties experienced in use of prior constructions.

Also, it is an object of the invention to provide a new wreath holder construction on which a wreath may be mounted securely in a few seconds without the use of tools or wiring.

Further, it is an object of the invention to provide a new wreath holder construction with an upright support having a plurality of relatively adjustable clamp-hooks for engaging, holding and locking in fixed position on the holder wreaths of various sizes and types and having various sizes, shapes and thicknesses of backing members engaged by the clamp-hooks, using only one size of holder.

Moreover, it is an object of the invention to provide a new wreath holder construction incorporating the features described and provided with a prong anchor, preferably offset form the main upright support member, so that the holder may be anchored securely in the ground, and so that when equipped with the offset anchor, the holder may be located with the prong anchor adjacent a grave marker without the upright support member interfering with grass mowing.

Likewise, it is an object of the invention to provide a new wreath holder construction which is generally flat and requires only a minimum sized package for shipment or storage; and preferably which may include a foldable joint intermediate the ends of the upright support member so that the holder can be shipped or stored along with a wreath in the wreath carton.

Also, it is an object of the invention to provide a new wreath holder construction which incorporates some or all of the features described and which when anchored in the ground at a selected cemetery location will remain anchored and securely hold a wreath in fixed position on the holder for long periods of time in all kinds of weather and against accidental dislodgement of the wreath from the fixed anchored position.

Finally, it is an object of the invention to provide a new wreath holder construction which solves existing problems in the art, eliminates the described difficulties, and obtains the indicated advantages and objectives in a simple, effective and inexpensive manner.

These and other objects and advantages apparent to those skilled in the art from the following description and claims, may be obtained, the stated results achieved, and the described difficulties overcome by the constructions, arrangements, combinations, parts and devices which comprise the present invention, the nature of which is set forth in the following general statement, preferred embodiments of which—illustrative of the best modes in which applicants have contemplated applying the principles—are set forth in the following description and shown in the drawings, and which are particularly and distinctly pointed out and set forth in the appended claim forming part hereof.

The nature of the improved wreath holder construction of the present invention may be stated in general terms as preferably including an upright, post-like, support member; anchor means at the lower end of said member; the anchor means preferably being offset laterally of the upright member; spaced, wreath-engageable, upturned, prong means located below the upper end of and fixed to the upright member; an upper, wreath-engageable, downturned prong member spaced from the prong means; means mounting the prong member for slidable adjustment along the upright member above the prong means; the upright member preferably having a hinge joint intermediate its ends to permit folding; and releasable latch means for the hinge joint normally holding the upright member extended in upright position; whereby wreaths of various types and sizes may be engaged by the prong means and member of a single size of holder to securely hold the selected wreath in fixed position on the holder without wiring the wreath to the holder.

By way of example, preferred embodiments of the wreath holder construction of the invention are illustrated in the accompanying drawings forming part hereof wherein;

FIGURE 1 is a perspective view of one form of improved wreath holder provided with offset anchor means at a cemetery location showing one step in the operation of securely mounting a wreath on the holder;

FIG. 2 is a fragmentary view similar to FIG. 1 showing a wreath of one size in full lines securely mounted on the holder and showing a larger sized wreath in dot-dash lines adapted to being securely mounted on the same holder;

FIG. 3 is an enlarged fragmentary elevation with parts broken away of a slightly modified form of holder;

FIG. 4 is a side view of the parts shown in FIG. 3;

FIG. 5 is a view similar to FIG. 3 of a further modified form of holder;

FIG. 6 is a side view of the parts shown in FIG. 5;

Similar numerals refer to similar parts throughout the various figures of the drawings.

Figure 7:
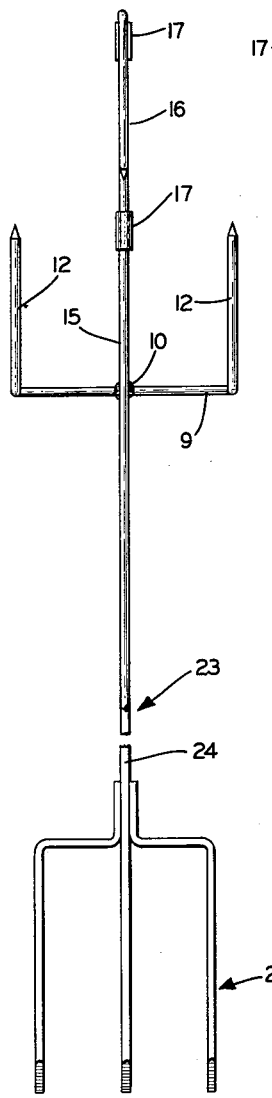
FIG. 7 is a front elevation of a further modified form of holder.

One form of improved wreath holder is indicated generally at 1 in FIGS. 1 and 2 and includes an upright, post-like, support member 2. Anchor means 3 are provided at the lower end of the support member 2. The anchor means 3 may comprise a forked arrangement formed by a U-shaped rod 4 welded at 5 adjacent the lower end of member 2. The lower ends of member 2 and U-shaped rod 4 may be pointed for easy ground penetration.

As shown in FIG. 1, support member 2 may be bent laterally and then upright to provide an offset 6 so that the anchor means 3 of the holder 1 can be driven into the ground alongside of a flush grave marker 7 with the offset 6 extending part way along the top face of the marker 7. In this manner, those portions of the support member 2 extending above the offset 6 and grave marker 7 do not interfere with mowing of grass in the region of the marker 7 and wreath holder 1.

Wreath engaging prong means 8 are mounted on the support member 2 spaced below the upper end of the member 2. The prong means 8 may be formed by lateral rod portion 9 welded at 10 to the upright support member 2 terminating in outturned portions 11 and upturned pointed prongs 12 so that the upturned pointed prongs 12 are spaced from one another in fixed positions with respect to the support member 2, as shown, because of weld 10 and the rigidity of the rod from which portions 9, 11 and 12 are formed.

The backing ring 13 of a wreath 14 of any size may be forced downward as shown in FIGS. 1 and 2 to imbed the spaced prongs 12 upward into the backing ring to securely support the weight of the wreath 14 on the holder 1.

A movable rod 15 formed with a downturned integral or rigid prong member 16 at its upper end is slidably mounted on the support 2 in passages formed by a pair of spaced U-shaped straps 17 preferably welded to the upper end of support member 2. In this manner, the prong member 16 may be adjusted longitudinally of the member 2 so that in extended position as shown in FIG. 1, the prong 16 will clear the backing ring of wreaths 14 of various sizes. When member 15 is moved downward toward a wreath, the integral prong member 16 also moves downward and clampingly engages and becomes imbedded in the backing ring member 14 as shown in FIG. 2 to securely exteriorly grip and clamp the wreath between the three prongs 12 and 16.

Thus, the wreath 14 securely clamped in fixed position on a holder 1 is held securely against being knocked down or blown over when the holder 1 is anchored in the ground as shown in FIGS. 1 and 2. The mounting and clamping of the wreath 14 in fixed position on the holder 1 is accomplished in a few seconds by mere manipulation of the slidable rod 15 carrying the upper downturned prong member 16, thus eliminating the time-consuming wiring procedure heretofore required in fastening wreaths to prior art holders.

The modified form of holder generally indicated at 18 in FIGS. 3 and 4 is similar to the holder 1 of FIGS. 1 and 2 except that the offset 6 in the support member 2 is omitted in the holder 18; and the fork-like anchor means of the holder 18 may be formed by spot-welding at 19 two-double angled pointed prongs 20 to the lower end of support member 2.

The modified holder 21 of FIGS. 5 and 6 is similar in construction to the holder shown in FIG. 1 but omits the offset portion 6 and involves a slightly different slidable mounting for the rod 15 carrying the downturned prong member 16. In the holder 21, the rod 15 is slidably mounted within a tube 22 mounted on the upper end of the support member 2, the tube 22 replacing the straps 17 forming the mounting means for the holders 1 and 18 of FIGS. 1 to 4.

Figure 8:
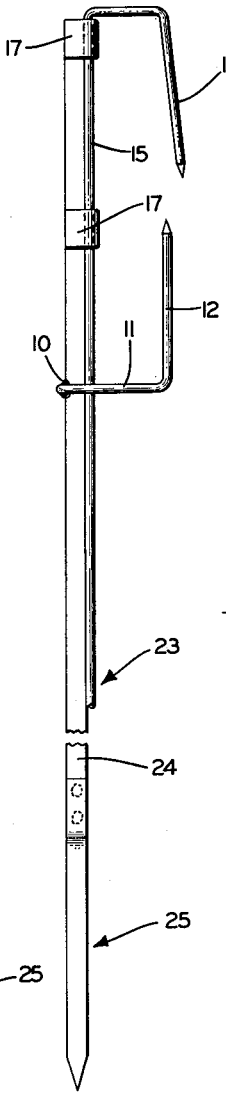
FIG. 8 is a side view of the parts shown in FIG. 7.
Figure 9:
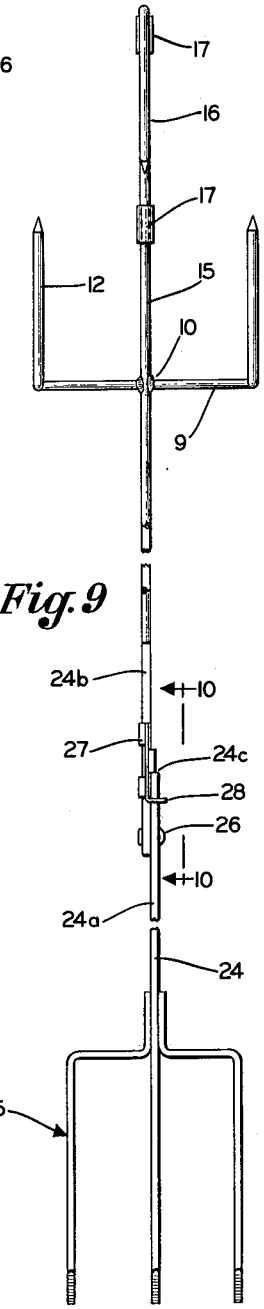
FIG. 9 is a view similar to FIG. 7 of a further modified form of foldable holder.
Figure 10:
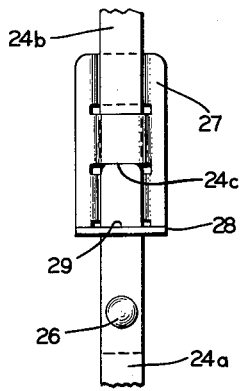
FIG. 10 is a fragmentary side view of portions of FIG. 9 looking in the direction of the arrows 10—10, FIG. 9.

The modified form of holder 23 shown in FIGS. 7 and 8 is similar to the holder 18 of FIGS. 3 and 4 except that the support member 24 and anchor means 25 are formed of flat metal strips rather than metal rods illustrated in the construction of holder 18.

All of the holders 1, 18, 21 and 23 are stiff, strong and rigid and can be packaged for shipment and storage in a minimum sized carton of a length necessary to accommodate the overall height of the holder.

In some instances, it may be desirable to reduce the packaged length of the holder when not in use, for instance when it may be advantageous to ship a holder along with a wreath in a rectangular wreath-containing carton.

Figure 11:
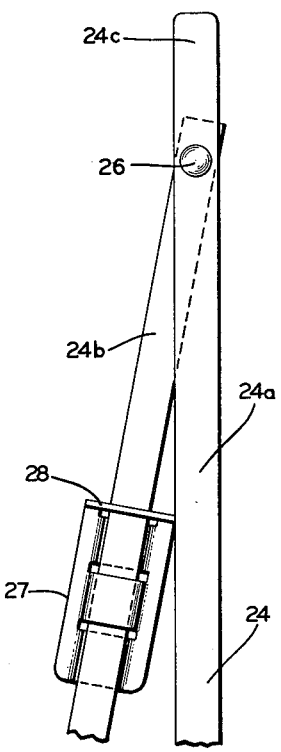
FIG. 11 is a side view of the holder shown in FIG. 9 with the parts in folded position.
Figure 12:
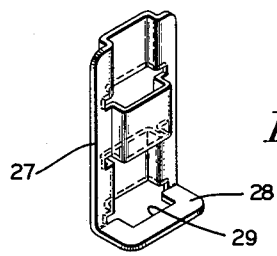
FIG. 12 is a perspective view of the releasable latch member for the hinged joint of the holder shown in FIG. 9.

This shortening of the effective length of the holder for shipping and storage may be accomplished as shown in FIGS. 9 to 12 by providing a hinged joint 26 for the upright support member 24 intermediate the ends of the support member so that the support member portions 24a and 24b may be folded together as shown in FIG. 11. The support member 24 with its portions 24a and 24b in upright extended position illustrated in FIG. 9 may be latched in such position by a latch member 27 (FIG. 12) slidably mounted on upper support portion 24b having an angled foot 28 formed with an opening 29 slidably engageable over the upper end 24c of support portion 24a.

Accordingly, the improved wreath holder of the present invention provides a stable holder construction for securely mounting wreaths of various sizes on a single sized holder in fixed position without requiring special tools or wiring; provides a construction which may be securely anchored in the ground at a cemetery location without likelihood of the holder or wreath clamped thereon being knocked down or blown over; provides a holder having the advantages and satisfying the objects indicated; and provides a holder solving existing problems in the art in a simple and effective manner.

In the foregoing description, certain terms have been used for brevity, clearness and understanding but no unnecessary limitations are to be implied therefrom beyond the requirements of the prior art, because such words are used for descriptive purposes herein and are intended to be broadly construed.

Moreover, the embodiments of the improved wreath holder construction illustrated and described herein are by way of example, and the scope of the invention is not limited to the exact details, sizes, etc., shown.

Having now described the features, constructions and principles of the invention, the characteristics of the improved wreath holder construction, and the advantageous, new and useful results provided; the new and useful con- structions, arrangements, combinations, parts and devices, and mechanical equivalents obvious to those skilled in the art are set forth in the appended claim.

We claim:

Wreath holder construction including an upright, post-like, support member having upper and lower ends; anchor means at the lower end of said member; spaced, upturned, wreath-engageable, rigid prong means fixedly mounted on the member; the prong means mounting being spaced from the upper end of the support member; a rod-like member formed at its upper end with a wreath-engageable, downturned rigid prong spaced from the prong mean; and means slidably mounting the rod-like member along the upper end of the upright member with the downturned rigid prong always located above the prong means; whereby wreaths of various sizes may be clamped securely between the upturned prong means and downturned prong to hold such wreaths in fixed position on a holder of one size without wiring.

References Cited in the file of this patent

UNITED STATES PATENTS

| | | |
|---|---|---|
| 1,720,338 | Loper | July 9, 1929 |
| 1,958,716 | Roach | May 15, 1934 |
| 1,997,142 | Hanson | Apr. 9, 1935 |
| 2,190,960 | Wagler | Feb. 20, 1940 |
| 2,614,778 | Graves | Oct. 21, 1952 |

FOREIGN PATENTS

| | | |
|---|---|---|
| 318,686 | France | Feb. 14, 1902 |